United States Patent
Oshins et al.

(10) Patent No.: US 6,832,278 B2
(45) Date of Patent: Dec. 14, 2004

(54) PCI BAR TARGET OPERATION REGION

(75) Inventors: Jacob Oshins, Seattle, WA (US); Stephane G. Plante, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 198 days.

(21) Appl. No.: 09/809,639

(22) Filed: Mar. 15, 2001

(65) Prior Publication Data
US 2002/0170951 A1 Nov. 21, 2002

(51) Int. Cl.[7] .............................. G06F 13/00; G06F 9/00
(52) U.S. Cl. ............................... 710/104; 713/1; 713/2; 713/100
(58) Field of Search ......................... 710/104, 300–304; 713/1, 2, 100

(56) References Cited

U.S. PATENT DOCUMENTS

| | | | |
|---|---|---|---|
| 5,787,246 A | * | 7/1998 | Lichtman et al. ........... 709/220 |
| 5,809,329 A | * | 9/1998 | Lichtman et al. ............... 710/8 |
| 5,819,107 A | * | 10/1998 | Lichtman et al. ............... 710/8 |
| 5,903,894 A | * | 5/1999 | Reneris ....................... 707/100 |

OTHER PUBLICATIONS

McHale, T., "PCI Bridge Chip Complies With Two Key Specs. (DEC's 21152 PCI–to–PCI Bridge Chip);" *Electronic Buyer's News*, n. 1071, Aug. 18, 1997, p. 20.

"California Micro Devices Extends P/Active Product Family and Enters Power Management Arena With PCI Power Management Switch," *Newswire*, Nov. 11, 1998.

"Madge Networks' Presto Plus Adapter Delivers Industry's Best Price/Performance;" *Newswire*, Nov. 25, 1998.

"Toshiba Launches First Portable PC Host–Controller LSI for SD Memory Card and SmartMedia; Supporting Integration of Dedicated Portable Personal Computer Slots;" *Newswire*, Oct. 2, 2000, p. 2244.

* cited by examiner

*Primary Examiner*—Tim Vo
(74) *Attorney, Agent, or Firm*—Merchant & Gould P.C.

(57) ABSTRACT

Described is a system and method by which a PCI device may be controlled by firmware in an Advanced Configuration and Power Management system. A device connected to the PCI bus is described in firmware with AML that declares a PCI BAR operation region associated with the PCI device. A generic driver is loaded and registers itself to handle any access to or from the PCI device my means of the PCI BAR operation region. Essentially, the generic driver is enumerated as a functional driver (FDO) for the PCI device. When a Plug-n-Play manager assigns base addresses to each PCI device on the PCI bus, the generic driver stores this information. Calls by the firmware to the PCI BAR operation region identify the PCI BAR number (i.e., the PCI device) and give an offset. The generic driver resolves that information into an absolute memory or I/O address based on the current BAR assigned by the PnP manager and performs the requested access.

20 Claims, 7 Drawing Sheets

PCI BAR TARGET OPERATION REGION

FIELD OF THE INVENTION

The present invention relates to Advanced Configuration and Power Management. More particularly, the invention relates to managing PCI devices in conjunction with an Advanced Configuration and Power Management system.

BACKGROUND OF THE INVENTION

Every computer has a few, if not many, devices that only the firmware interacts with. In most machines this is a thermal sensor, a memory controller, or perhaps an ASIC that controls the brightness of the LCD screen of a laptop. The firmware may interact with these devices in non-prescribed or prescribed ways. If the firmware is forced to use non- prescribed ways, like an SMI trap or a straight BIOS call, the operating system cannot guarantee that the computer will perform properly, and the user is more likely to experience a lockup or a crash. When the firmware uses prescribed ways, then the operating system can ensure that the interactions with the device happen in controlled and correct ways, which makes the computer vastly less likely to crash. One such prescribed way is through the use of ACPI (Advanced Configuration and Power Interface) Machine Language (AML) code to control the devices. ACPI is an open industry specification that defines a flexible and extensible interface for power management. The interface enables and supports power management through improved hardware and operating system coordination.

One way to allow firmware control of hardware devices is to put those devices on the Industry Standard Architecture (ISA) bus. The ISA bus is a non-Plug-and-Play bus, so the hardware manufacturer could put devices on it and leave the descriptions of those devices out of the firmware. Since the operating system relies on firmware to describe to it the undiscoverable devices, the operating system would never know about or use them, leaving them to be controlled purely by the firmware. However, the ISA bus is becoming less and less common in computers, and will eventually become extinct. For that reason, hardware manufacturers would like to implement these firmware-controlled devices on the Peripheral Component Interconnect (PCI) bus or "Mezzanine Bus", which is much more widely supported. However, implementing these devices as PCI devices presents new challenges. For instance, the operating system attempts to use every PCI device that it can find in the machine. If a device driver is not available to control the PCI device, then the operating system treats this as an error situation. However, creating a device driver for each such device creates a burden on the hardware manufacturers that isn't necessarily justified given the simplicity of the type of devices at issue.

To further complicate matters, the PCI Specification requires that PCI devices be dynamically configurable. PCI devices each include an address space called the Configuration Space. At offset 0x10 through offset 0x27, there are as many as six Base Address Registers, (BARs). These BARs contain the base address of a series of control registers (in I/O or Memory space) for the PCI device. A Plug and Play (PnP) operating system may change the values of these BARs at any time to relocate (or "rebalance") the PCI devices within the computer's address space. For that reason, the firmware cannot read from or write to the control registers deterministically because the operating system may reassign the PCI device's BAR at runtime. Furthermore, a PnP operating system automatically assigns ownership of the I/O and memory regions associated with the BARs to a device driver associated with the PCI device, adding to the need for a specific device driver for each PCI device. Moreover, an ACPI-compliant operating system does not allow firmware code to read from or write to regions that are owned by other device drivers.

These and other problems have prevented computer manufacturers from achieving an acceptable solution for supporting firmware-controlled devices. Thus, there is a need in the art for just such a solution.

SUMMARY OF THE INVENTION

Briefly stated, the present invention provides a system and method by which a PCI device may be controlled by firmware in an Advanced Configuration and Power Management system. More specifically, the present invention enables a PCI BAR Operation Region through which PCI devices may be accessed. A device connected to the PCI bus is described in firmware with AML that declares a PCI BAR operation region associated with the PCI device. A generic driver is loaded and registers itself to handle any access to or from the PCI device by means of the PCI BAR operation region. Essentially, the genetic driver is enumerated as a functional driver (FDO) for the PCI device. When a Plug-n-Play manager assigns base addresses to each PCI device on the PCI bus, the generic driver stores this information. Calls by the firmware to the PCI BAR operation region identify the PCI BAR number (i.e., the PCI device) and give an offset The generic driver resolves that information into an absolute memory or I/O address based on the current BAR assigned by the PnP manager and performs the requested access.

In this way, the PnP manager may rebalance the PCI devices without fear that the PCI devices will become unavailable or be "lost" to the firmware. It should be noted that during a rebalance, the PCI Bar operation region is temporarily unavailable. Accesses of the operation region cannot be handled while the system is reprogramming the BARs. However, the operation region driver may "queue" outstanding requests until the reprogramming is complete, with the caveat that the process of reprogramming the BARs cannot access the BARs to do so (thereby generating a circular set of references) since that would cause a deadlock. By creating a PCI BAR operation region, manufacturers of relatively-simple PCI devices are relieved of the burden of creating device-specific drivers.

DETAILED DESCRIPTION OF THE PREFERRED EMBODIMENT

The present invention provides a new operation region for use with particular PCI devices to enable them to be firmware controlled. This detailed description first describes how the new PCI BAR operation region is implemented in an exemplary ACPI system. The detailed description then proceeds with a discussion of how the new PCI BAR operation region is used to access PCI devices. Finally, the detailed description concludes with a summary of general processes that are performed by implementations of the invention.

Exemplary Operating Environment

Figure 1:
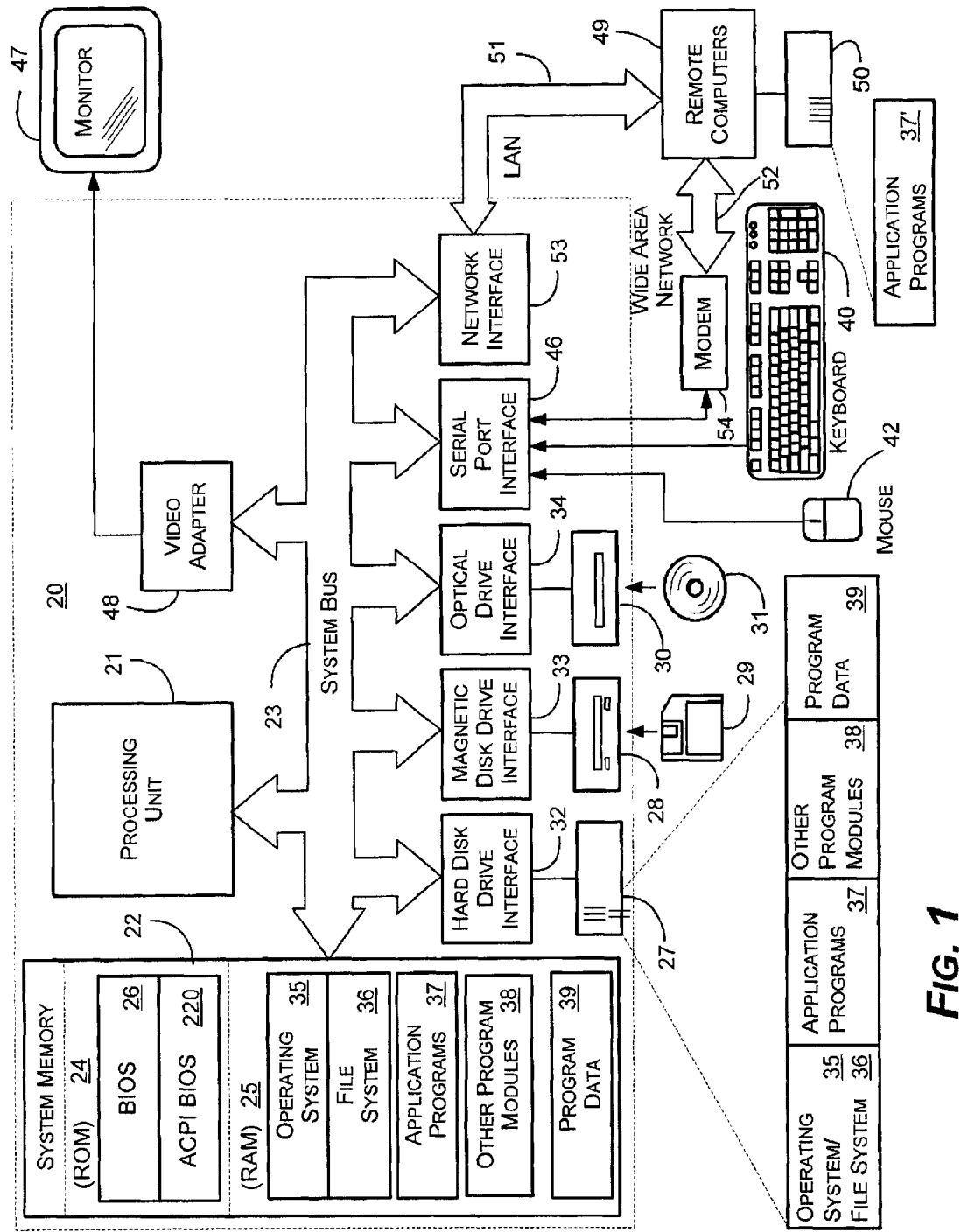
FIG. 1 is a functional block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer system. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer system 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the computer system 20, such as during start-up, is stored in ROM 24. An ACPI BIOS 220 is additionally stored in ROM 24, and may be stored as a portion of the BIOS 26. The ACPI BIOS 220 is described more fully below.

The computer system 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer system 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows NT® File System (NTFS), one or more application programs 37, other program modules 38 and program data 39. A user may enter commands and information into the computer system 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computer systems typically include other peripheral output devices (not shown), such as speakers and printers.

The computer system 20 may operate in a networked environment using logical connections to one or more remote computers 49. The remote computer (or computers) 49 may be another computer system, a server, a router, a network PC, a peer device or other common network node, and typically includes many or all of the elements described above relative to the computer system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the computer system 20 is connected to the local network 51 through a network interface or adapter 53. When used in a WAN networking environment, the computer system 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer system 20, or portions thereof, may be stored in the remote memory storage device. It will be appreciated that the network connections shown are exemplary and other means of establishing a communications link between the computers may be used.

Illustrative Configuration Management System

Figure 2:
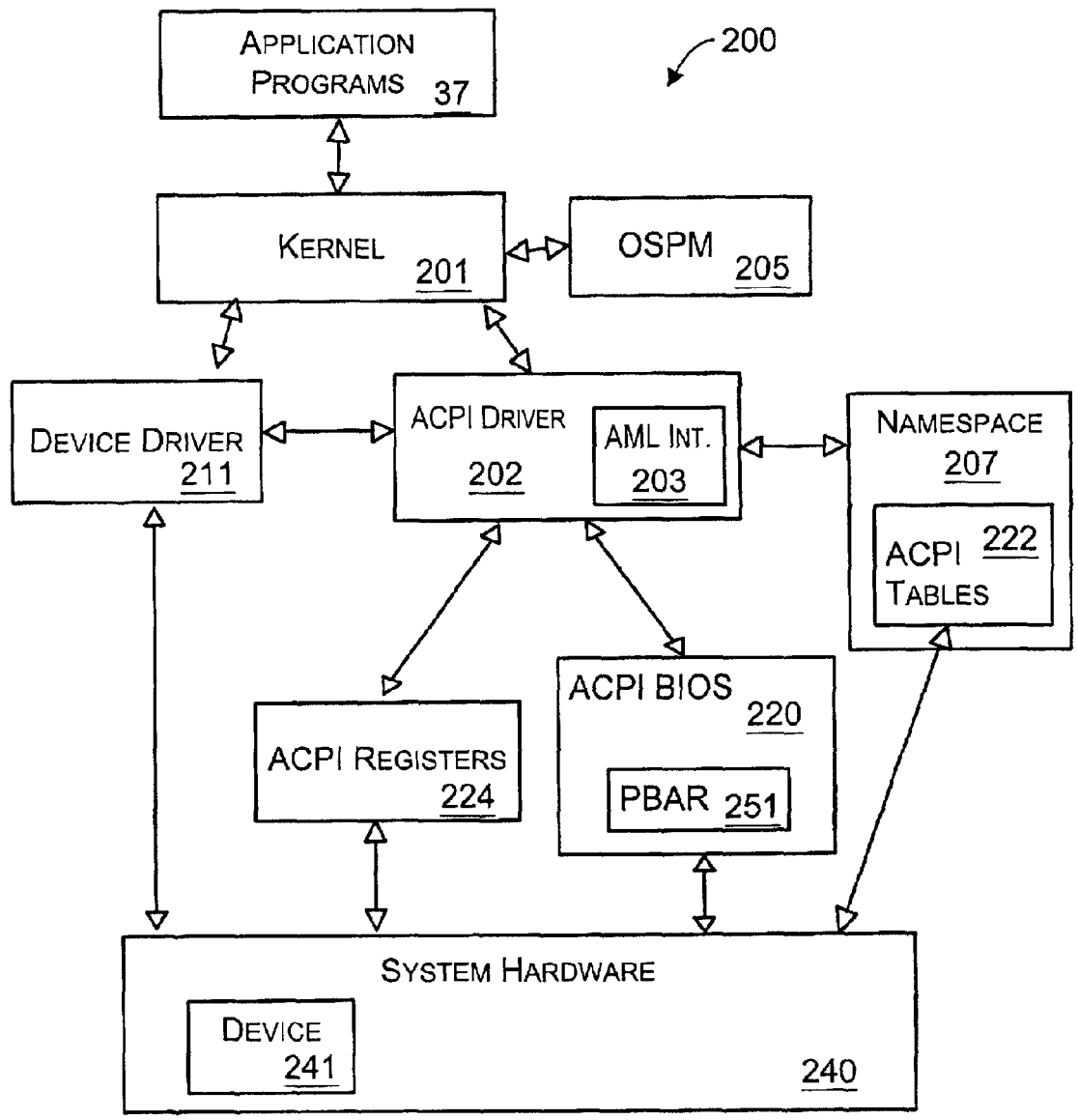
FIG. 2 is a functional block diagram of an illustrative configuration management system constructed in accordance with one implementation of the present invention.

FIG. 2 is a functional block diagram of an ACPI system 200 as implemented in the computer system 20 of FIG. 1. The ACPI system 200 illustrated is one example of a configuration management system that may implement and benefit from the present invention. The present invention may be described herein with reference to the ACPI configuration management system, however, there is no intention to limit the present invention to ACPI. Rather, the present invention is intended to operate with and provide benefits with any operating system, architecture, and/or configuration management system.

As shown, the application programs 37 may interface with a kernel 201, which is a part of the operating system 35. The kernel 201 can be generally considered as one or more software modules that are responsible for performing many operating system functions. One such function is passing information between the application programs 37 and the lower level components of the ACPI system 200, such as the ACPI driver 202 (described below), various device drivers (e.g., device driver 211), and the system hardware 240.

The kernel 201 interfaces with Operating System Power Management (OSPM) system code 205. The OSPM system code 205 includes one or more software modules that may be a part of the operating system 35 and that may be used to modify the behavior of certain components of the computer system 20, typically to conserve power in accordance with pre-configured power conservation settings. As is generally known, the various device drivers 211 interface with and generally control the system hardware 240 installed in the computer system 20.

The ACPI driver 202 is, generally speaking, a software module that controls the functioning of much of the ACPI system 200. The ACPI driver 202 may be supplied as part of the operating system 35 or as a separate component. In the described system, the ACPI driver 202 is loaded during system start-up at the base of a tree of devices, where it acts as an interface between the operating system 35 and the ACPI BIOS 220 (described below). The responsibilities of the ACPI driver 202 include support for plug and play (PnP) and power management. The ACPI driver 202 is responsible for initiating and maintaining the ACPI system 200, such as by populating an ACPI namespace 207 (illustrated in detail in FIG. 3 and described below) at system startup, loading and unloading description blocks from the ACPI namespace at run time, handling certain generic events triggered by ACPI hardware, and handing off other events to modules registered to handle those events.

The ACPI driver 202 makes use of several components when performing the functions of the ACPI system 200. One component is the ACPI BIOS 220, which refers to the portion of system firmware that is compatible with the ACPI specification. Generally stated, the ACPI BIOS 220 is part of the code that boots the machine (similar to the BIOS 26 present in most conventional computer systems) and implements interfaces for power and configuration operations, such as sleep, wake, and some restart operations. The ACPI BIOS 220 contains definition blocks used to construct ACPI Tables 222, as is described in greater detail below. The definition blocks are written in an interpreted language called ACPI Source Language (ASL), which is converted to ACPI machine language (AML) to be interpreted by an AML interpreter 203 within the ACPI driver 202. One definition block, a Differentiated Definition Block (DDB), describes the base computer system. Other definition blocks may be provided to describe additional ACPI devices, such as hardware device 241. Note that the ACPI BIOS 220 and the BIOS 26 (FIG. 1) are illustrated as separate components for simplicity of discussion only, and the two may be implemented as a single component.

During the boot process, the definition blocks are read from the ACPI BIOS 220 and stored in an ACPI namespace 207 as ACPI tables 222. The ACPI tables 222 contain data and/or control methods that define and provide access to hardware devices. A "control method" is a software module that defines how the ACPI system 200 performs a hardware-related task. For example, the ACPI system 200 may invoke a control method to read the temperature of a thermal zone. Once in the ACPI namespace 207, the control methods may be invoked by other components in the ACPI system 200, such as device drivers 211 or the like, and are then interpreted and executed by the AML interpreter 203.

The hardware device 241 may be any hardware device connected to the PCI bus and which is intended to be kept under firmware control. Common examples may be a thermal sensor, a memory controller, or an ASIC that controls the brightness of the LCD screen of a laptop. Other examples will become readily apparent to those skilled in the art. In this particular embodiment, the ACPI BIOS 220 includes at least one definition block (i.e., PCI BAR Definition Block or "PBAR" 251) that describes the hardware device 241 and declares a PCI BAR operation region in connection with the hardware device 241. The construction and use of the PCI BAR operation region is described in detail later in connection with FIG. 3. At this point, it is sufficient to note that early during the boot process (i.e., prior to loading many other device drivers), the ACPI tables 222 are created in the ACPI namespace 207 from definition blocks stored in the ACPI BIOS 220, including the PBAR 251 that creates a PCI BAR operation region in connection with the PCI device 241.

The ACPI registers 224 are a constrained part of the hardware interface, described (at least in location) by the ACPI Tables 222. The ACPI registers 224 allow the hardware devices to surface events to the ACPI driver 202 by setting bits associated with the particular hardware devices, similar in function to a system interrupt. Refer to the publicly-available ACPI Specification Version 2.0 for a more detailed discussion of the ACPI tables 222, the ACPI registers 224, definition blocks, and the functions performed by the ACPI driver 202.

Before proceeding, an overview of the mechanisms used by the firmware to control the hardware through the ACPI system is helpful. As just mentioned, ACPI control methods are written in an interpreted language (AML) and are executed in a virtual machine supported by an ACPI-compatible operating system. AML is similar to a load-store language and is oriented around the concept of an "operation region." Any I/O action is done with respect to a field object. Each field object is defined as a section (proper subset) of an operation region. So any load or store ultimately references an operation region. For example, a firmware developer could debug firmware code by adding an LED that responds to I/O port 0×80. One byte of data is displayed on the LED whenever software or firmware writes to that port. This could be defined in the ACPI namespace by declaring an operation region of type "I/O" with an address of 0×80, a length of 8 bits and a name of DEBG. A field unit, named DBUG, could be similarly declared referencing the entire length of DEBG. Thus any data that AML stored to DBUG would be displayed on the debug card.

It should be noted that the preceding example focuses on a type of device for which the present invention is unnecessary, but is only provided as one example of how the firmware interacts with a device through the operation region mechanism. In the past, there were only five defined operation region types: Memory, I/O, PCI Configuration, Embedded Controller, and SMBus. However, in accordance with the present invention, a new operation region type (the PCI BAR operation region) is used to facilitate firmware-controlled interaction with particular PCI devices.

Figure 3:
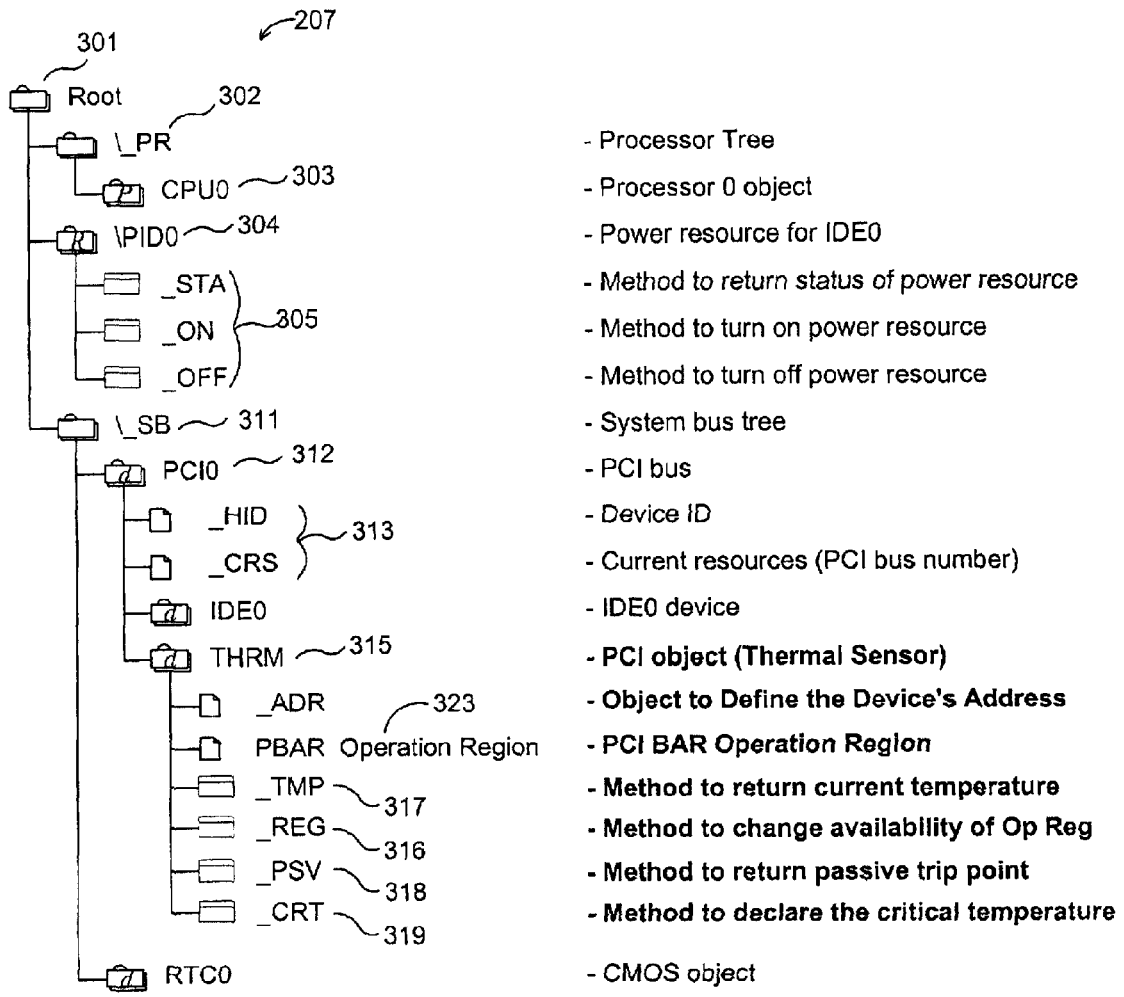
FIG. 3 is a graphical representation of a namespace employed by the illustrative configuration management system illustrated in FIG. 2 and embodying one implementation of the present invention.

FIG. 3 is a graphical representation of the ACPI namespace 207 which essentially includes a working version of the ACPI tables 222. The ACPI namespace 207 is a hierarchical tree structure that contains named objects which describe the ACPI-aware devices installed in the computer system 20. The objects may be data objects, control method objects, bus/device package objects, or the like. As mentioned, at boot time, the operating system 35 (via the ACPI driver 202) reads the definition blocks from the ACPI BIOS 220 to build the ACPI tables 222 in the ACPI namespace 207. The ACPI driver 202 may dynamically change the contents of the ACPI namespace 207 at run time by loading and/or unloading additional definition blocks from the ACPI Tables 222.

Shown in FIG. 3 is one illustrative ACPI namespace 207, containing a namespace root 301, several illustrative branches under the root, and several other objects of various types. For example, under the root is a system bus tree \_SB 311. The \_SB namespace includes namespace objects that define ACPI-compliant components attached to the system bus. One example of such a namespace object is the PCI bus namespace object 312. Each namespace object may contain other objects, such as data objects 313, control methods 305, or other namespace objects. Several control methods may be loaded in the ACPI namespace 207 in connection with various objects.

As mentioned above, in this implementation, the ACPI BIOS 220 includes a definition block (PBAR 251) that defines a special namespace object (a "PCI object") 315 to be used for access to the PCI device 241. The PCI device 241 is a thermal sensor in this example. Among other things, the PCI object includes a data object 323 that declares a PCI BAR operation region through which the PCI device 241 may be accessed in the manner described above. Associated control methods, such as control method 325, may also be included with the PCI object 315. For example, a control method (_TMP 317) for querying the current temperature of a thermal zone (THRM 315), a control method (_PSV 318) for determining the passive trip point of the thermal zone, and a control method (_CRT 319) for determining the critical temperature of the thermal zone may be loaded within the scope of the thermal zone object 315. The following sample ACPI Source language (ASL) may be used to define the PCI object 315 illustrated in FIG. 3, including the operation region 323:

```
Device (THRM)
{
    Name(_ADR, 0x10002)
        OperationRegion(PBAR, PciBarTarget, 0x10, 0x4)
        Field(PBAR, DWordAcc, NoLock, Preserve)
        {
            // 0x00–0x01
            RS,     1,     // RUN/STOP
            HCR,    1,     // ASIC Reset
            GRES,   1,     // Global Reset
            EGSM,   1,     // Enter Global Suspend Mode
            FGR,    1,     // Force Global Resume
            SWDB,   1,     // Software Debug
            CF,     1,     // Configure Flag
            MAXP,   1,     // Max Packet
            RES0,   8,     // Reserved
        }
        Method(_REG, 0x2, NotSerialized)
    {
        Store(1, \_SB_.PCI0.THRM.HCR)
```

-continued

```
        Store(1, \_SB_.PCI0.THRM.GRES)
        Store(0, \_SB_.PCI0.THRM.FGR)
    }
}
```

Referring to FIG. 3, the sample ASL code above defines a PCI object 315 named "THRM." The PCI object 315 declares the PCI BAR operation region 323 with the statement "OperationRegion(PBAR, PCIBARTarget, 0x10, 0x4)," which is accessible through the variable "PBAR" defined in the "field" statement. This would be an example of an operation region that uses the first BAR in the device. The statement including "Method(_REG, 2)" declares a control method 316 to inform the system of a change in the availability of an operation region. When an operation region handler is unavailable, AML cannot access data fields in that operation region. The use of this method will become apparent later. Of course, other ASL code will be equally useful to create other PCI objects and other PCI BAR operation regions, as will be apparent to those skilled in the art.

Data accesses to the PCI device are performed through the use of the PCI BAR Target operation region 323. When a command is issued by a device driver or other process that invokes a read or write to the new operation region (e.g., a read of a control register within the PCI device 241), the ACPI driver 202 passes that command to the provider registered to handle that operation region. In the described implementation, a special "PCI BAR target provider driver" 421 (FIG. 4) registers itself to handle the PCI BAR operation region. The functions of the PCI BAR target provider driver 421 and its interaction with the PCI device 241 and the ACPI driver 202 are described below in connection with FIG. 4.

To summarize, during the boot process, the ACPI driver 202 reads the PCI BAR definition block 251, which describes the PCI device 241, and builds a set of related objects within the namespace 207 to control the PCI device 241. One of those objects declares a PCI BAR operation region 323, through which access to the PCI device 241 is obtained.

Illustrative Device Driver Environment

Figure 4:
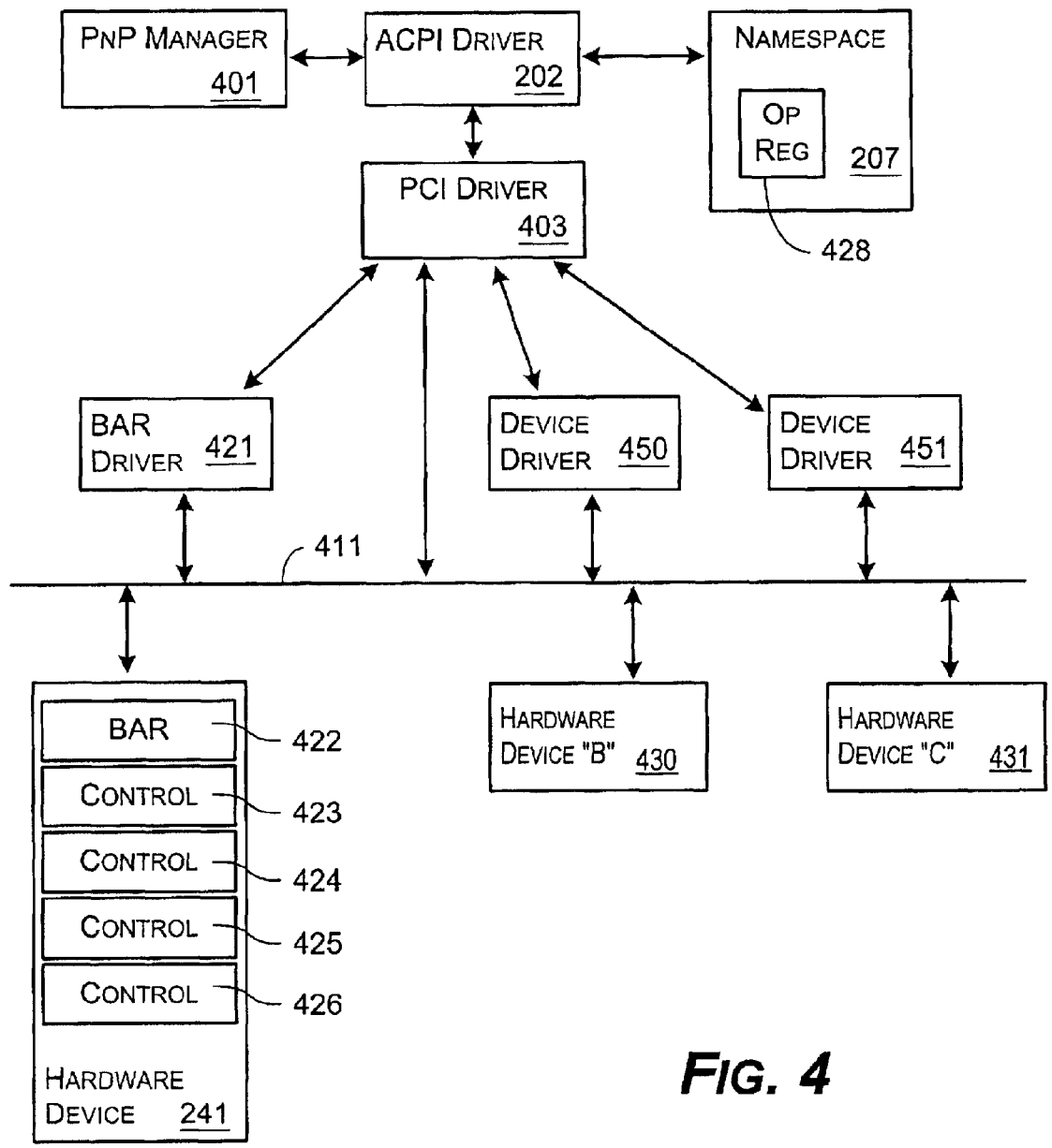
FIG. 4 is a functional block diagram generally illustrating several pertinent device drivers that are used to enable access to the PCI device in accordance with one implementation of the invention.

FIG. 4 is a functional block diagram generally illustrating several pertinent device drivers that are used to enable access to the PCI device 241 in accordance with this implementation of the invention. Illustrated are a PnP manager 401 and a PCI driver 403, which each interact with the ACPI driver 202. The PnP manager 401 may be a part of the system kernel 201 (FIG. 2) and is responsible for managing the Plug and Play aspects of the computer system. More specifically, the PnP manager 401 works with an I/O manager (not shown) and the PCI driver 403 (as well as other drivers which are not pertinent to this discussion) to guide the allocation of hardware resources as well as to detect and respond to the arrival and removal of hardware devices.

The PCI driver 403 is responsible for managing the hardware devices on a PCI bus 411. The PCI driver 403 detects and informs the PnP manager 401 of devices attached to the PCI bus 411. The PCI driver 403 detects bus membership changes (device addition or removal), assists the PnP manager 401 in enumerating the devices on the bus, accesses bus-specific configuration registers, and in some cases, controls power to devices on the PCI bus 411.

There may be several hardware devices on the PCI bus 411, such as the PCI device 241 under discussion as well as many others. For simplicity of discussion, two illustrative hardware devices are shown as hardware device "B" 430, which could be a PCI fax modem, and hardware device "C" 431, which could be an Ethernet network card. Each hardware device on the PCI bus includes one or more Base Address Registers (e.g., BAR 422) that contains the base address of an I/O or Memory region that the PCI hardware device's control registers lie within. For instance, the PCI device 241 includes a BAR 422 and one or more control registers 423–426 that are used to control the device. To access a particular control register, such as control register 426, a memory or I/O instruction would be performed at the base address stored within the BAR together with an offset that identifies which control register, control register 426 in this example. Each BAR implements a protocol for determining whether those control registers are within I/O or Memory space and how much address space the PCI device decodes.

Figure 5:
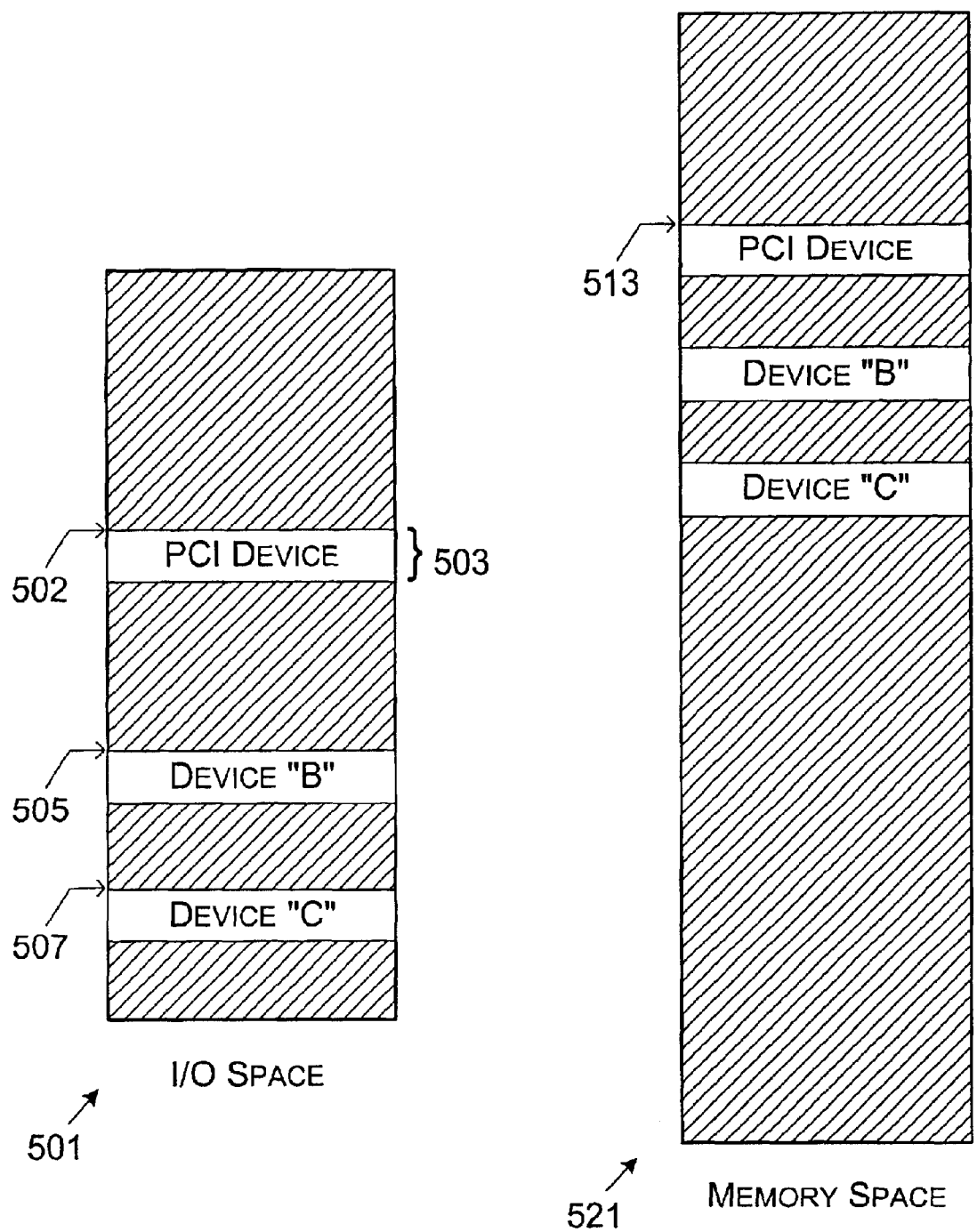
FIG. 5 is a graphical representation of an I/O space and a Memory space within which are found regions of addresses associated with each of the hardware devices illustrated in FIG. 4.

Turning briefly to FIG. 5 (with continued reference to FIG. 4), a graphical representation is shown of an I/O space 501 and a Memory space 521 within which are found a region of addresses associated with each of the hardware devices illustrated in FIG. 4. Note that the PCI device 241 begins at an address location 502 within I/O space 501 that corresponds to the value within the BAR 422. Each control register 423–426 within the PCI device 241 is located at some offset within the address space 503 associated with the base address 502. There may be another BAR within the PCI device 241 that includes another base address 513 for the PCI device 241 within memory space 521. Each device on the PCI bus has its own base address, such as base address 505 for hardware device "B" 430 and base address 507 for hardware device "C" 431, and set of offsets for its control registers.

Returning to FIG. 4, during the boot process, the PnP manager 401 loads the several components of the system in the following manner. Briefly stated, the PnP manager requests each driver, starting at the root level of the system or with a "primary bus enumerator," to enumerate those devices which are attached to its bus, either logical or physical. In other words, the drivers are requested to report their children. The PnP manager 401 loads drivers for each device reported. In the described system, the PnP manager 401 begins by loading the ACPI driver 202 as the primary bus enumerator 202. The ACPI driver 202 reports the PCI bus 411 as its only child, and the PnP manager 401 loads the PCI driver 403 to control the PCI bus 411. The PCI driver 403 reports the several hardware devices (i.e., the PCI device 241, hardware device "B" 430, and hardware device "C" 431) as its children.

The PnP manager 401 loads function drivers for each hardware device reported. For example, device driver 450 is loaded to control hardware device "B" 430, and device driver 451 is loaded to control hardware device "C" 431. Once a device driver has been loaded, the PnP manager 401 assigns it ownership of the address space pointed to by the BAR (e.g., BAR 422) for the respective hardware device. However, in the case of the PCI device 241, as mentioned above, no special device driver is present to control it. Rather, the PCI device 241 is intended to be firmware-controlled instead of operating system controlled. This is known by the ACPI driver 202 because of the existence in the namespace 207 of a PCI BAR operation region 428 associated with the PCI device 241 (as described above in conjunction with FIG. 3). This information is used by the ACPI driver 202 to register an external helper-driver to handle the PCI device 241 when it is enumerated by the PCI driver 403. Alternatively, the ACPI driver 202 may register itself to handle the PCI device 241.

In other words, when the PCI driver 403 reports the PCI device 241, the ACPI driver 202 (having noticed that the PCI device 241 has an associated PCI BAR operation region 428) instructs the PnP manager 401 to load the PCI BAR target provider driver 421 to control the PCI device 241. The PCI BAR target provider driver 421 is responsible for receiving access commands regarding the PCI device 241 from the ACPI driver 202 in the context of the PCI BAR target operation region. The PCI BAR target provider driver 421 resolves the access commands given as an offset from the BAR address into effective addresses and issues the actual read or write on the PCI bus 411. In this way, a special device driver need not be created for each hardware device on the PCI bus 411, but rather, by creating PCI BAR operation regions for those devices, the PCI BAR target provider driver 421 can be used to manage the BARs for those devices. It should be noted that the PCI BAR target provider driver 421 may alternatively be implemented as additional functionality within the ACPI driver 202, thereby eliminating the need for a separate driver.

Through the use of the above-described structure, the PnP manager 401 may properly manage the resources of the hardware devices on the PCI bus 411. For example, if the PCI bus 411 needs to be rebalanced, such as if new hardware is connected, the PnP manager may send an instruction down the driver stacks of each affected device indicating the PnP manager's intent to perform the rebalance. Typical device drivers (e.g., device driver 450) are already programmed to handle that event in accordance with the PCI Specification. However, in the case of firmware-controlled devices, such as the PCI device 241, the PCI BAR target provider driver 421 is now registered to handle the rebalance, thereby eliminating the need to develop a special purpose driver for each such firmware-controlled PCI hardware device.

More specifically, in response to the notification of the rebalance from the PnP manager 401, the PCI BAR target provider driver 421 may issue an instruction that causes the _REG method 316 (FIG. 3) to be executed to indicate that the current PCI BAR operation region should not be used. Once the PnP manager 401 has reallocated the proper resources, it sends another message notifying each device driver, including the PCI BAR target provider driver 421, of a new base address register for the several devices. Alternatively, rather than executing the _REG method 316 when a rebalance is in progress, the PCI BAR target provider driver 421 could queue outstanding requests to access the PCI BAR operation region until the rebalance is complete (if there are no circular references, such as may be created by using the PCI Bar Target to start the device). The PCI driver 403 then sets the value of the base address in the BAR of each hardware device, including the PCI device 241. In this way, the firmware is included in the process of managing the base address register for firmware-controlled PCI devices, thus avoiding the problems identified with previous systems.

Generalized Operation of the Configuration Management System

Figure 6:
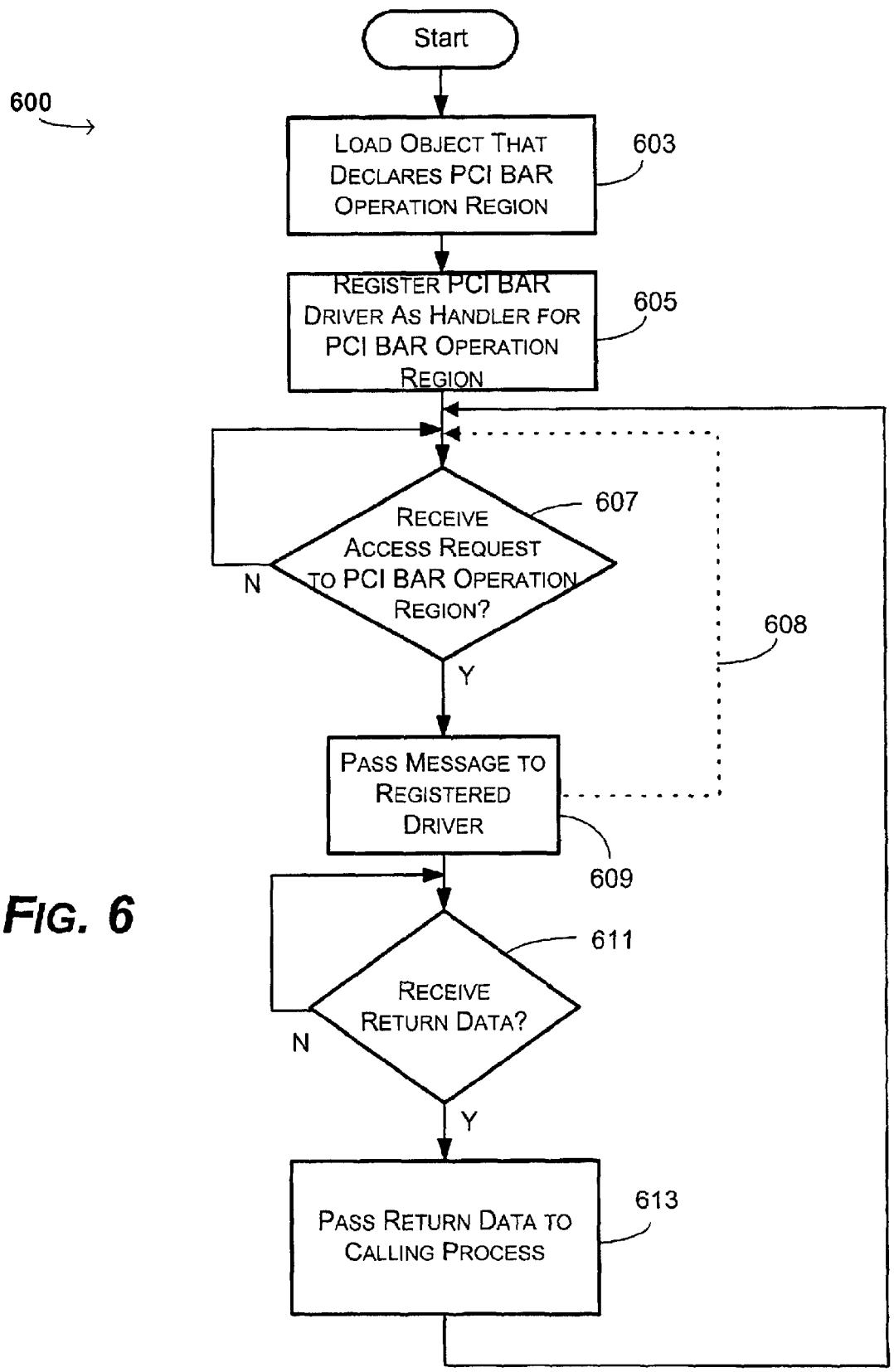
FIG. 6 is a logical flow diagram generally illustrating a process to provide firmware access to a PCI device, in accordance with one embodiment of the present invention.
Figure 7:
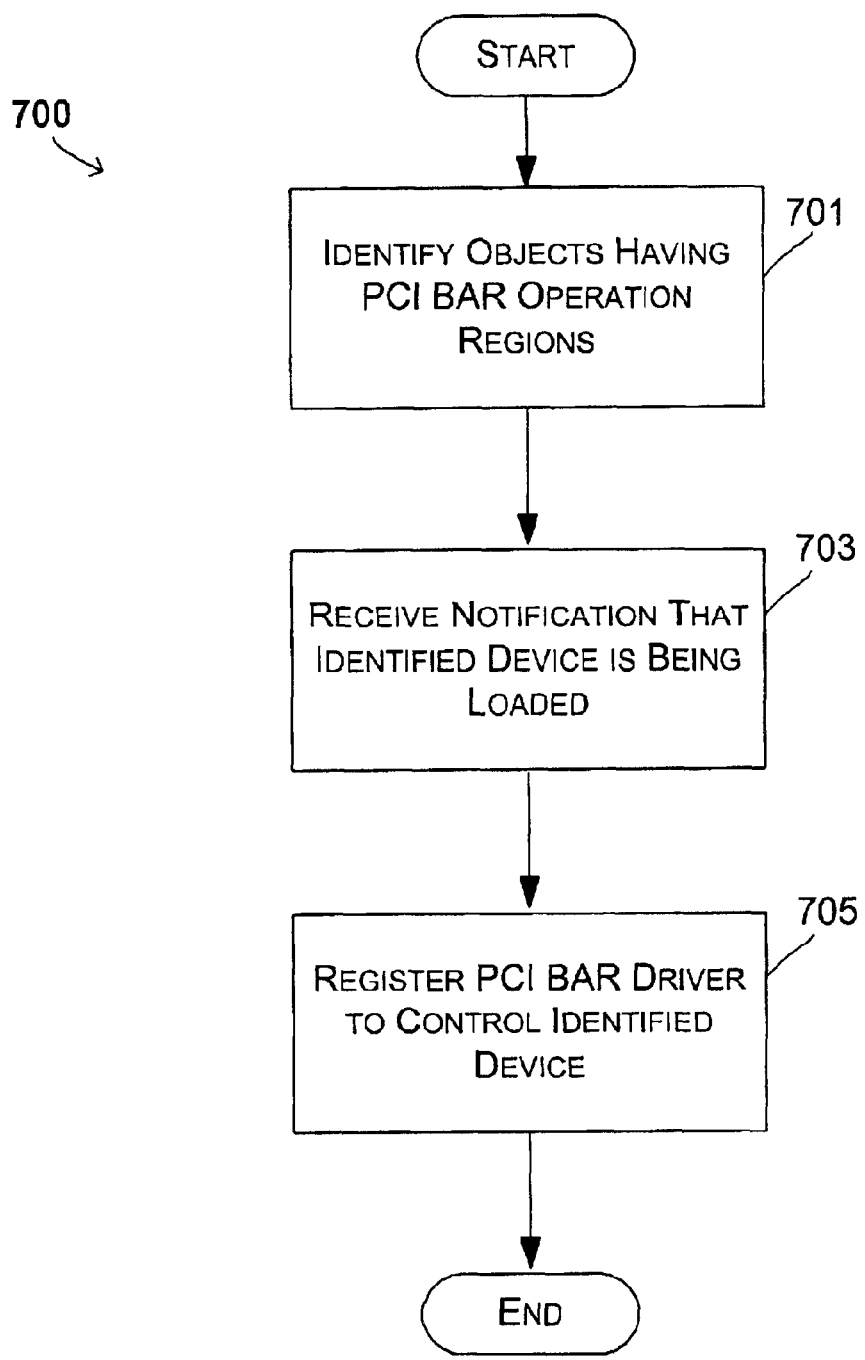
FIG. 7 is a logical flow diagram generally illustrating a process to register a PCI BAR target provider driver to handle access to a PCI device, in accordance with one embodiment of the present invention.

FIGS. 6 and 7 are logical flow diagrams summarizing processes performed by components of the above-described illustrative configuration management system implementing the present invention. FIG. 6 is a logical flow diagram generally illustrating a process 600 performed by the ACPI driver 202 of the ACPI system 200 to provide access to a PCI device 241.

The process begins at block 603, where the ACPI driver 202 loads into memory a namespace object that defines an operation region for passing information to and from a PCI device. For example, in the system illustrated in FIGS. 2–5, a PCI BAR operation region 323 is defined as a data object to be used when reading from or writing to the control registers of the PCI device defined by the namespace object THRM 315.

At block 605, the ACPI driver 202 registers a provider to handle access requests to the PCI BAR operation region defined at block 603. The ACPI driver 202 may internally maintain lists or tables that describe how each operation region is handled, or it may resort to an external registration source. In this example, a PCI BAR target provider driver 421 is registered by the ACPI driver 202 as a provider for the PCI BAR operation region type. Alternatively, the functionality of the PCI BAR target provider driver 421 may be implemented in the ACPI driver 202, allowing the ACPI driver 202 to maintain control over access to the PCI device 241 in connection with the PCI BAR operation region.

At decision block 607, the ACPI driver 202 idles (or simply performs other functions) until it ultimately receives a message or request to access the PCI BAR operation region defined at block 603. For example, a device driver or other firmware code may request that the ACPI system 200 retrieve some value (such as a system temperature) from a control register within the PCI device 241. That is performed by issuing a read instruction to the PCI BAR operation region 323. In those cases, the ACPI driver 202 passes the message or request to the provider registered to handle the PCI BAR operation region at block 609, the PCI BAR target provider driver 421 in this instance.

At decision block 611, the ACPI driver 202 awaits the return of any data that may have been requested by the message. It should be noted that return data might not be necessary, such as in the case of a write of data to the PCI device 241. If return data is not appropriate, the process 600 may return to await another access request as illustrated by the dashed line 608 from block 609 to the decision block 607. For the cases where return data is appropriate, the ACPI driver 202 awaits, at decision block 611, for the return data. When the ACPI driver 202 receives the return data, the process 600 proceeds to block 613. As will be appreciated, the process 600 may terminate naturally through timeout mechanisms (not shown) while waiting for data to return.

At block 613, the ACPI driver 202 passes the data received at decision block 611 back to the mechanism (e.g., a control method) that requested the data. For example, the PCI BAR target provider driver 421 may return data that is retrieved from the PCI device 241 to whatever control method requested the data.

Once the ACPI driver 202 passes the return data to the configuration management system 200, the process 600 returns to block 607 to await further requests until otherwise terminated, such as by the expiration of a timer or interrupted by another process.

FIG. 7 is a logical flow diagram generally illustrating a process 700 performed by the ACPI driver 202 to register the PCI BAR target provider driver 421 to handle access of the PCI device 241. The process 700 begins at block 701 where the ACPI driver 202 identifies objects within the ACPI namespace 207 that declare a PCI BAR operation region. This operation may be performed in conjunction with loading the ACPI tables 222 in the ACPI namespace 207. At that point, a list may be created identifying those objects that declare a PCI BAR operation region.

At block 703, the ACPI driver 202 receives a notification that one of the devices identified at block 701 is in the process of being loaded. For example, during an enumeration process, the PCI driver 403 may pass a notification to the PnP manager 401 of the devices attached to the PCI bus 411. As discussed above, those devices that have PCI BAR operation regions associated with them in the ACPI namespace 207 are intended to be firmware controlled, and thus have no special functional driver associated with them. For that reason, at block 705, the ACPI driver 202 registers the PCI BAR target provider driver 421 as the functional driver to handle the particular firmware-controlled devices. At that point, the PnP manager 401 may issue one or more notifications to the device drivers (including the PCI BAR target provider driver 421) of the base address values for their respective devices.

As can be seen from the foregoing detailed description, the invention provides a system and method for allowing firmware-controlled access to a PCI device through a configuration management system. While the invention is susceptible to various modifications and alternative constructions, certain illustrated embodiments thereof are shown in the drawings and have been described above in detail. It should be understood that the invention is not limited to the specific forms disclosed, but rather, the invention covers all modifications, alternatives, and equivalents falling within the spirit and scope of the claims.

We claim:

1. A computer-implemented method for accessing data, comprising:

receiving a first request to access data associated with a PCI device, the first request being received at a system for maintaining a namespace containing a plurality of software objects describing hardware devices associated with a computing system;

identifying the first request to access the data as being associated with a defined operation region associated with the PCI device; and passing the first request to a process provider registered to handle access to the PCI device, the process provider comprising a generic driver that is programmed to resolve and maintain addressing information for a plurality of PCI devices, including the PCI device, such that each PCI device is operable using the generic driver.

2. The computer-readable medium of claim 1, further comprising:

receiving data returned from the process provider; and passing the returned data to the requesting component.

3. The computer-readable medium of claim 1, wherein the defined operation region comprises a PCI BAR Target operation region of the configuration management system.

4. The computer-readable medium of claim 1, wherein the first request to access data associated with the PCI device comprises a command generated by firmware associated with the computing system.

5. The computer-readable medium of claim 2, wherein the data returned from the process provider comprises information associated with the PCI device.

6. The computer-readable medium of claim 4, wherein the command generated by the firmware comprises a control method request to access the data, the control method being one of the software objects within the namespace.

7. A computer-readable medium having computer-executable components, comprising:

a definition block including a PCI object that defines an operation region for accessing a firmware-controlled PCI device associated with the PCI object, the operation region facilitating firmware-controlled interaction with the PCI device;

a first module configured to populate an information store in a configuration management system with information from the definition block including the PCI object; and a second module configured to register with the configuration management system to handle an instruction directed to the operation region, the second module comprising a generic driver for resolving instructions received from the first module into an effective address location for the PCI device, such that each PCI device is operable using the generic driver.

8. The computer-readable medium of claim 7, wherein the first module is further configured to pass instructions directed at the operation region to the second module registered to handle the instructions.

9. The computer-readable medium of claim 7, wherein the definition block comprises executable instructions for creating the PCI object within a namespace of configuration management system.

10. The computer-readable medium of claim 7, wherein the second module receives a base address identifying an address space within which the effective address location resides.

11. The computer-readable medium of claim 1, wherein the generic driver is a functional driver for the PCI device.

12. The computer-readable medium of claim 7, wherein the generic driver is a functional driver for the PCI device.

13. The computer-readable medium of claim 9, wherein the configuration management system comprises an Advanced Configuration and Power Interface system.

14. The computer-readable medium of claim 9, wherein the operation region is defined as a PCI BAR Target operation region associated with the PCI device.

15. The computer-readable medium of claim 9, wherein the definition block further includes executable instructions for creating a control method that, when executed, temporarily suspends use of the operation region.

16. The computer-readable medium of claim 10, wherein the base address is stored in a base address register on the PCI device.

17. The computer-readable medium of claim 15, wherein the control method is programmed to notify the configuration management system of a change in the availability of the operation region.

18. The computer-readable medium of claim 16, wherein the base address is stored in the base address register by a component of the computing system responsible for allocating resources for the PCI device.

19. The computer-readable medium of claim 16, wherein the base address is assigned by a resource manager, and wherein the base address is stored by a bus driver associated with a PCI bus to which is attached the PCI device.

20. The computer-readable medium of claim 17, wherein the control method comprises a $_{13}$ REG control method of the configuration management system.

* * * * *